Nov. 26, 1957 — M. D. KOZEL — 2,814,796
VEHICLE SPEED INDICATOR
Filed June 29, 1956 — 2 Sheets-Sheet 1

Michael D. Kozel
INVENTOR.

BY *Clarence A. O'Brien and Harvey B. Jacobson*
Attorneys

Nov. 26, 1957  M. D. KOZEL  2,814,796
VEHICLE SPEED INDICATOR
Filed June 29, 1956  2 Sheets-Sheet 2
Fig. 2
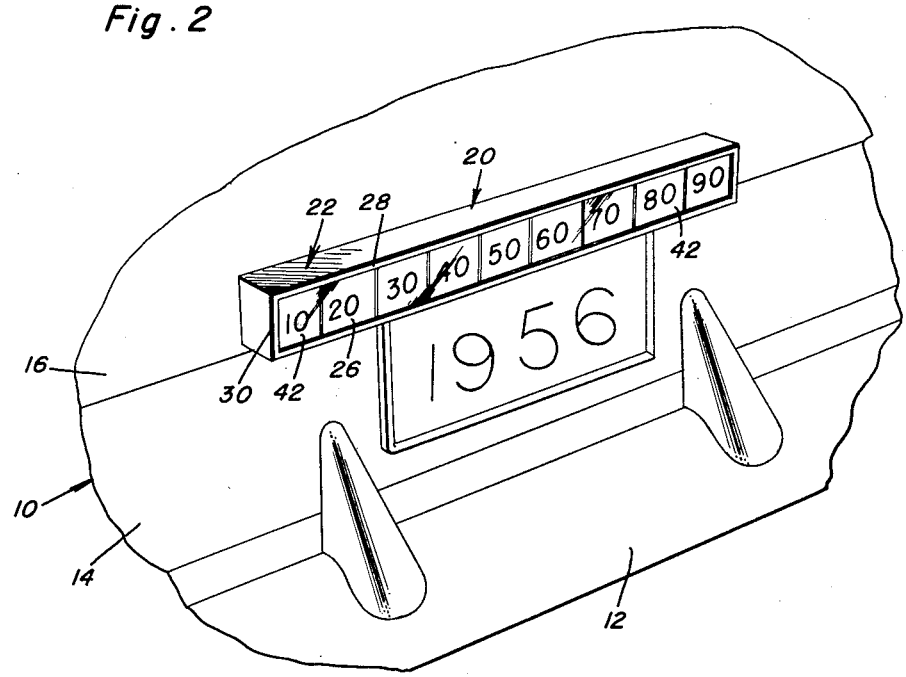
Fig. 7
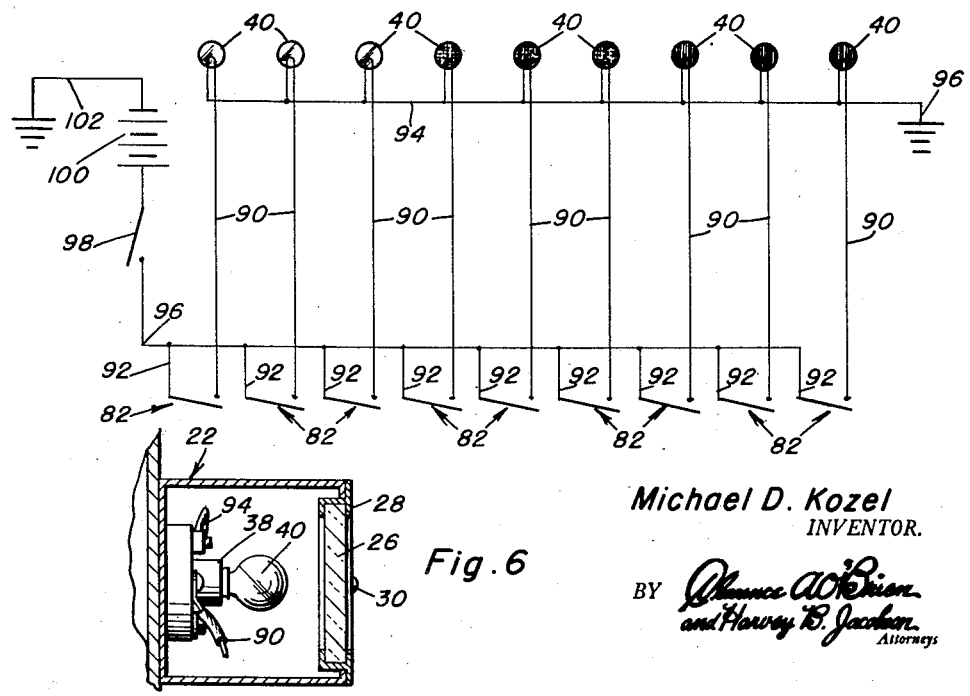
Fig. 6
Michael D. Kozel
INVENTOR.
BY
Attorneys

United States Patent Office 2,814,796
Patented Nov. 26, 1957

2,814,796

VEHICLE SPEED INDICATOR

Michael D. Kozel, Flushing, N. Y.

Application June 29, 1956, Serial No. 594,973

5 Claims. (Cl. 340—263)

This invention relates in general to new and useful improvements in speed indicators for vehicles, and more specifically to an improved speed indicator which includes a speed indicating device mounted externally of the vehicle.

At the present time communities have built up to the extent that it is absolutely necessary for vehicles passing therethrough to maintain a relatively low speed. While most drivers maintain the restricted speed, a certain percentage of drivers, as in all instances, have a tendency to exceed the maximum speed set. It has been found that the speeding vehicles normally are the ones which are not under sufficient control to prevent the accidental injury or death of a pedestrian or collisions with other vehicles at intersections or vehicles moving into and out of parking places.

It is therefore the primary object of this invention to provide a speed indicator which is of such a nature whereby a person in trailing vehicles as well as the general public walking down the street may readily tell at a glance the speed which is being obtained with the vehicle, the driver of such vehicle knowing the public is well aware of his speed would then have a tendency to drive at the lawful rate.

A large number of accidents also occur due to the inability of a following car to determine the rate at which he is overtaking the car in front of him, particularly in the case where the first car has begun to slow down after having accelerated for a period of time. It is therefore another object of this invention to provide an improved warning device in the form of a visible speed indicator at the rear of a vehicle so that the overtaking vehicle may determine the exact speed at which the vehicle in front of him is maintaining.

Another object of this invention is to provide an improved visible speed indicator which has a control mechanism of such a nature whereby it may be mounted on existing types of speedometers for actuation by the pointer thereof without requiring the adaptation to the mechanism of the speedometer.

A further object of this invention is to provide an improved switch mechanism for a speed indicator, the switch mechanism including a plurality of switches, each of the switches having an actuator in the form of a pie-slice shaped member which is engaged by the pointer of the speedometer for movement into a switch closing or a switch opening position, the actuators being of such a configuration whereby the pointer of the speedometer may pass thereover after moving it to the desired position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a fragmentary rear perspective view of the vehicle of which the instrument panel of Figure 1 forms a part and shows mounted on the rear part thereof a signalling device for indicating the speed which is being attained by the vehicle;

Figure 6 is an enlarged fragmentary sectional view taken substantially upon the plane indicated by the section line 6—6 of Figure 5 and shows further the details of the signal device; and Figure 7 is a wiring diagram for the visible speed indicator.

Figure 1:
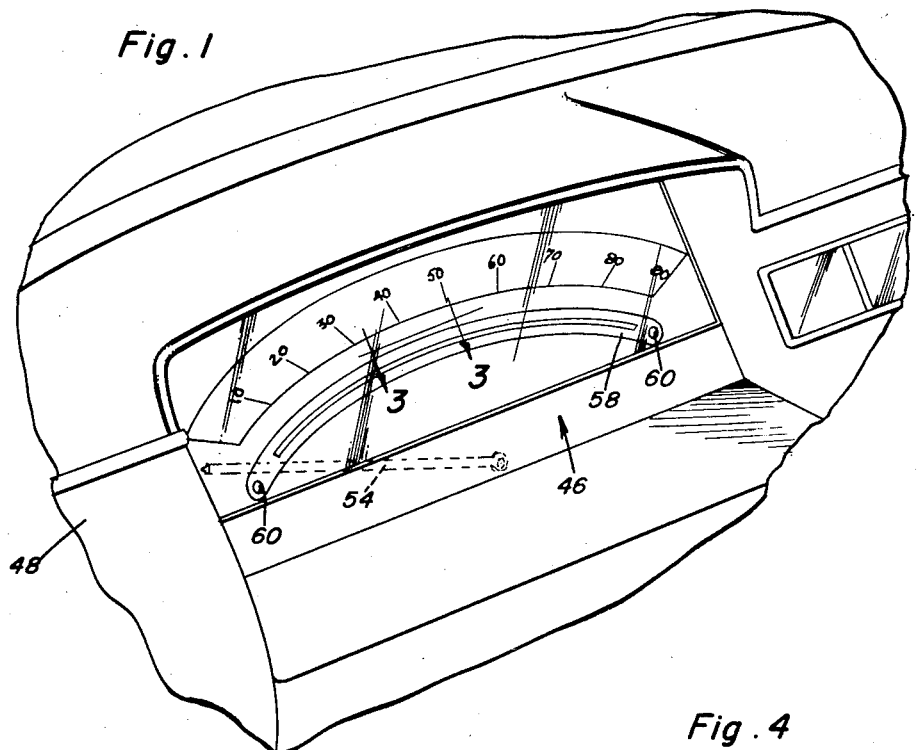
Figure 1 is a fragmentary view of the instrument panel of the vehicle showing the speedometer portion thereof, the speedometer having mounted thereon a control mechanism for operating the visible speed indicator which is the subject of this invention.

Referring now to Figure 2 in particular, it will be seen that there is illustrated the rear portion of a vehicle which is referred to in general by the reference numeral 10. The vehicle 10 may be of any make and includes a bumper 12, a rear body portion 14 and a trunk lid 16. Mounted on the trunk lid 16 or any other suitable part of the vehicle 10 is a speed indicating signal device which is referred to in general by the reference numeral 20, the speed indicating signal device 20 being a component of the speed indicator which is the subject of this invention.

The speed indicating signal device 20 includes an elongated housing which is referred to in general by the reference numeral 22. The housing 22 has an open rear side 24 which is closed by a transparent panel 26 mounted in a suitable frame 28 which is removably secured to the housing 22 by means of fasteners 30, as is best illustrated in Figure 6. The housing 22 is suitably secured to the trunk lid 16 by means of fasteners 32.

The housing 22 is divided into a plurality of separate compartments 34 by means of divider strips 36. Mounted in each of the compartments 34 is a lamp socket 38 in which there is positioned a bulb 40. The transparent panel 26 is provided with suitable indicia 42 aligned with each of the compartments 34. The indicia 42 is in the form of numerals, preferably 10's and will indicate the general speed obtained by the vehicle 10. In the present instance there has been provided nine compartments to show speeds ranging from 0 to 90 miles per hour. In order that a bystander or a person following the vehicle 10 may quickly determine the speed of the vehicle 10, it is proposed that the bulb 40 for the compartments aligned with the indicia "10," "20" and "30" be green in color. The bulbs 40 for the next three compartments 34 will be amber in color and the bulbs for the higher speed compartments will be red in color. It is to be understood that the color of the bulbs may vary as desired. However, the arrangement proposed is that most acceptable to indicate speed zones including safe, questionable and dangerous.

In order that the bulbs 40 of the compartments 34 may be progressively lit, there is provided a suitable control mechanism which is referred to in general by the reference numeral 44. The control mechanism 44 is mounted on a speedometer which is referred to in general by the reference numeral 46. The speedometer 46 is of a conventional type and is mounted in an instrument panel 48 of the vehicle.

The speedometer 46 among other components includes a dial 50, a front cover glass 52 and a pointer 54, the pointer 54 being mounted on a suitable control shaft 55.

The dial 50 is provided with an arcuate slot 56 which is covered by an insulated strip 58 which is secured to the face of the dial by means of suitable fasteners 60, the strip 58 being arcuate in outline, as is best illustrated in Figure 1. The strip 58 is provided with an arcuate slot 62 which is aligned with the slot 56.

Suitably mounted rearwardly of the dial 50 is an insulative plate 64 on which there is mounted a plurality of U-shaped mounting brackets 66. The U-shaped brackets 66 are parts of actuators 68, there being one actuator for each of the bulbs 40. The U-shaped mounting brackets 66 are secured to the plate 64 by means of suitable fasteners 70. It is to be understood that the mounting brackets 66 are to be disposed in an arcuate pattern and aligned with the slot 56. Carried by each mounting bracket 66 is a pivot pin 72 on which there is mounted a pie-slice shaped member 74 having peripheral teeth elements 76.

Figure 3:
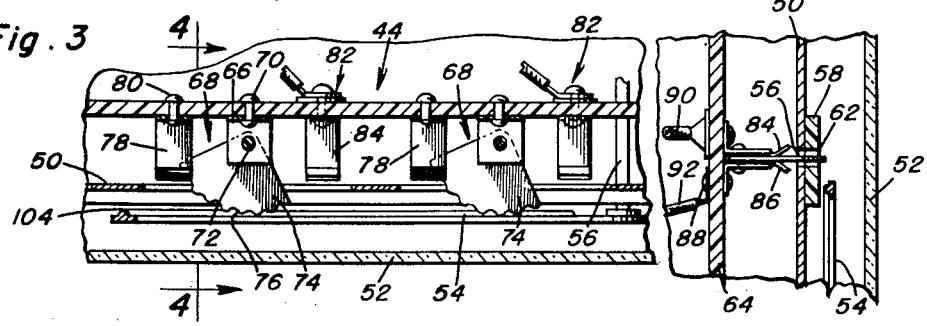
Figure 3 is an enlarged fragmentary sectional view taken substantially upon the plane indicated by section line 3—3 of Figure 1 and shows the general details of the control mechanism including the specific outline of the actuators and the manner in which they cooperate with the switches to selectively close the switches to illuminate the signal device.
Figure 4:
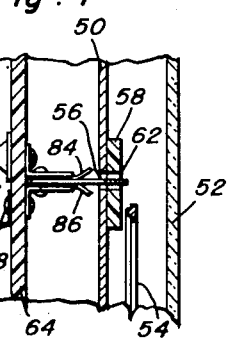
Figure 4 is an enlarged fragmentary sectional view taken substantially upon the plane indicated by the section line 4—4 of Figure 3 and shows further the details of the control mechanism.
Figure 5:
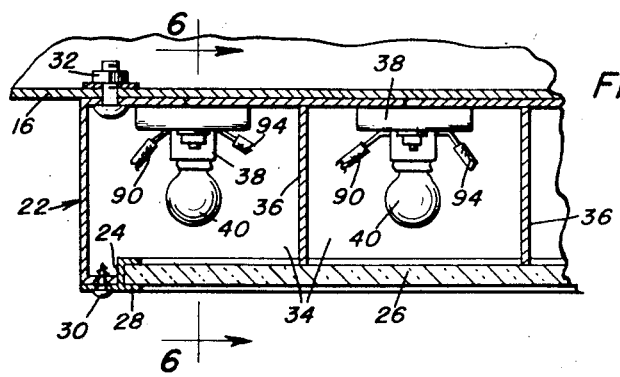
Figure 5 is an enlarged fragmentary horizontal sectional view taken through the signal device and shows the arrangement of bulbs mounted therein.

Disposed to the left of each of the actuators 68 is a U-shaped retaining clip 78. The U-shaped retaining clip 78 is secured to the insulated plate 64 by means of a fastener 80. Normally the member 74 is disposed within the confines of the retaining clip 78, as is clearly shown by solid lines in Figure 3.

Disposed to the right of each actuator 68 is a switch which is referred to in general by the reference numeral 82. There is provided one switch 82 for each of the bulbs 40. Each switch 82 is of the spaced contact type and includes a pair of contacts 84 and 86 which are disposed in spaced relation. The contacts 84 and 86 are secured to the insulator plate 64 by means of suitable fasteners 88. The fasteners 88 also electrically connect to the contacts 84 and 86 electric wires 90 and 92, respectively.

Referring now to the wiring diagram of Figure 7, it will be seen that each of the bulbs 40 is connected to a master ground wire 94 which is grounded as at 96. Further, each of the bulbs 40 is connected to a respective one of the switches 82 by means of a wire 90.

The wiring circuit for the signal device also includes a hot wire 96 which has connected thereto the wires 92. The hot wire 96 is connected to an ignition switch 98 of the vehicle 10 which is in turn connected to the battery 100, the battery 100 being grounded in a conventional manner by ground wire 102.

In the operation of the signal device which is the subject of this invention, once the vehicle 10 is moving, the ignition switch 98 will be closed and the hot wire 96 energized. As the speed of the vehicle 10 increases, the pointer 54 will swing about the dial 50 of the speedometer 46 and will progressively engage the members 74. As the pointer 54 swings in a clockwise direction, it will progressively engage each of the members 74 and swing it from an inoperative position engaged with its retaining clip 78 to an operative switch closing position between the contacts 84 and 86. It is to be noted that the pointer 54 is provided on the rear side thereof with a rib 104 which will engage between the teeth 76. Thus, positive engagement between the pointer 54 and each member 74 is assured. Further, once the member 74 has moved to a switch closing position, the pointer 54 will slide thereover and become disengaged therewith. The number of switches 82 which are closed will depend upon the speed of the vehicle as indicated by the speedometer 46. As the speed of the vehicle 10 increases, the pointer 54 will swing further to the right, as viewed in Figure 1, to close additional ones of the switches 82. This will result in the lighting of additional ones of the bulbs 40 to indicate the increased speed on the speed indicating signal device 20. On the other hand, should the speed of the vehicle 10 decrease, the pointer 54 will swing to the left and will re-engage the members 74 which are in the switch closing position. The members 74 will be swung to the left, as viewed in Figure 3, and once again be engaged by the retaining clips 78 to prevent the accidental movement thereof to a switch closing position. When the speed of the vehicle 10 has reduced to 0, all of the members 74 will have been returned to their initial position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a speedometer, a speed indicator, said speed indicator comprising a signal device, means for mounting said signal device on the exterior of a vehicle, said signal device including illuminating means, a control mechanism mounted on said speedometer, said speedometer including a pointer, said control mechanism including actuators disposed in the path of said pointer, means connecting said control mechanism to said signal device, each of said actuators being in the form of a pie-slice shaped blade member, means pivotally mounting said blade member, whereby said pointer passes over said actuators after movement of each of said actuators from one position to another.

2. In combination with a speedometer, a speed indicator, said speed indicator comprising a signal device, means for mounting said signal device on the exterior of a vehicle, said signal device including illuminating means, a control mechanism mounted on said speedometer, said speedometer including a pointer, said control mechanism including actuators disposed in the path of said pointer, means connecting said control mechanism to said signal device, each of said actuators being in the form of a pie-slice shaped blade member, means pivotally mounting said blade member, whereby said pointer passes over said actuators after movement of each of said actuators from one position to another, a switch for each of said actuators, said switch being of the spaced contact type for receiving said blade member therebetween to complete a circuit through said switch.

3. In combination with a speedometer, a speed indicator, said speed indicator comprising a signal device, means for mounting said signal device on the exterior of a vehicle, said signal device including illuminating means, a control mechanism mounted on said speedometer, said speedometer including a pointer, said control mechanism including actuators disposed in the path of said pointer, means connecting said control mechanism to said signal device, each of said actuators being in the form of a pie-slice shaped blade member, means pivotally mounting said blade member, whereby said pointer passes over said actuators after movement of each of said actuators from one position to another, a switch for each of said actuators, said switch being of the spaced contact type for receiving said blade member therebetween to complete a circuit through said switch, an actuator receiving clip for each actuator, said clip being disposed remote from the switch at its respective actuator and normally retaining said actuator in an inoperative position.

4. In combination with a speedometer, a speed indicator, said speed indicator comprising a signal device, means for mounting said signal device on the exterior of a vehicle, said signal device including illuminating means, a control mechanism mounted on said speedometer, said speedometer including a pointer, said control mechanism including actuators disposed in the path of said pointer, means connecting said control mechanism to said signal device, each of said actuators being in the form of a pie-slice shaped blade member, means pivotally mounting said blade member, whereby said pointer passes over said actuators after movement of each of said actuators from one position to another, a switch for each of said actuators, said switch being of the spaced contact type for receiving said blade member therebetween to complete a circuit through said switch, said signal device including a plurality of individual speed indicating sections, said illuminating means including a light for each of said speed indicating sections, one of said switches being connected to each of said lights.

5. In combination with a speedometer, a speed indicator, said speed indicator comprising a signal device, means for mounting said signal device on the exterior of a vehicle, said signal device including illuminating means, a control mechanism mounted on said speedometer, said speedometer including a pointer, said control mechanism including actuators disposed in the path of said pointer, means connecting said control mechanism to said signal device, each of said actuators being in the form of a pie-slice shaped blade member, means pivotally mounting said blade member, whereby said pointer passes over said actuators after movement of each of said actuators from one position to another, a switch for each of said actuators, said switch being of the spaced contact type for receiving said blade member therebetween to complete a circuit through said switch, said signal device including a plurality of individual speed indicating sections, said illuminating means including a light for each of said speed indicating sections, one of said switches being connected to each of said lights, an actuator receiving clip for each actuator, said clip being disposed remote from the switch of its respective actuator and normally retaining said actuator in an inoperative position.

References Cited in the file of this patent

UNITED STATES PATENTS

| | | |
|---|---|---|
| 2,154,670 | Donally | Apr. 18, 1939 |
| 2,261,770 | Kusinitz et al. | Nov. 4, 1941 |
| 2,452,344 | Addorisio | Oct. 26, 1948 |
| 2,771,524 | Fischer | Nov. 20, 1956 |